(12) United States Patent
Kumar

(10) Patent No.: US 11,113,780 B2
(45) Date of Patent: Sep. 7, 2021

(54) WATERMARKING DIGITAL CONTENT

(71) Applicant: Hewlett-Packard Development Company, L.P., Spring, TX (US)

(72) Inventor: Amrendra Kumar, Bangalore (IN)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/978,577

(22) PCT Filed: Feb. 11, 2019

(86) PCT No.: PCT/US2019/017415
§ 371 (c)(1),
(2) Date: Sep. 4, 2020

(87) PCT Pub. No.: WO2019/194900
PCT Pub. Date: Oct. 10, 2019

(65) Prior Publication Data
US 2021/0019856 A1    Jan. 21, 2021

(30) Foreign Application Priority Data

Apr. 6, 2018 (IN) .............................. 201841013309

(51) Int. Cl.
*G06T 1/00* (2006.01)
*H04N 1/32* (2006.01)

(52) U.S. Cl.
CPC ....... *G06T 1/0028* (2013.01); *H04N 1/32208* (2013.01); *H04N 1/32277* (2013.01)

(58) Field of Classification Search
CPC .............. G06T 1/0028; H04N 1/32208; H04N 1/32277; H04N 21/8352; H04N 21/8358
See application file for complete search history.

(56) References Cited

U.S. PATENT DOCUMENTS

| | | |
|---|---|---|
| 7,174,031 B2 | 2/2007 | Rhoads et al. |
| 7,508,955 B2 | 3/2009 | Carr et al. |
| 9,280,977 B2 | 3/2016 | Sharma |
| 9,667,829 B2 | 5/2017 | Bai et al. |
| 9,754,341 B2 | 9/2017 | Falkenstern et al. |
| 2003/0187798 A1 | 10/2003 | McKinley et al. |
| 2004/0258274 A1 | 12/2004 | Brundage et al. |
| 2017/0024845 A1* | 1/2017 | Filler ................... G06F 3/1282 |

FOREIGN PATENT DOCUMENTS

| | | |
|---|---|---|
| EP | 0495320 | 7/1992 |
| EP | 3041683 | 7/2016 |
| WO | WO-2016025631 A1 | 2/2016 |

\* cited by examiner

*Primary Examiner* — Christopher Wait
(74) *Attorney, Agent, or Firm* — HP Inc. Patent Department

(57) ABSTRACT

Examples relating to watermarking digital content are described herein. According to one example, a digital quality of digital content received for watermarking is determined. From a library of watermark tints comprising a plurality of preformed watermark tints of predefined sizes, a watermark tint set for watermarking the digital content is retrieved, the watermark tint set comprising a plurality of watermark tints having a first size. The first size of the plurality of watermark tints is determined based on the digital quality of the digital content. The plurality of watermark tints having the first size are overlaid over the digital content to watermark the digital content.

15 Claims, 6 Drawing Sheets

WATERMARKING DIGITAL CONTENT

BACKGROUND

Digital watermarking involves embedding of an indicator or a marker in digital content such as an audio, a video, or an image, and usually finds application in digital copyrights management and protection. For example, digital watermarking of a content may be helpful in identifying an owner identification of the digital content or for transaction-tracking of the digital content, i.e., for recording the transactions that take place in reference to that digital content. The transaction may include, for example, transmission, sharing, or access of the digital content. For this purpose, detectability of a watermark in the digital content is relevant.

BRIEF DESCRIPTION OF FIGURES

The detailed description is provided with reference to the accompanying figures. It should be noted that the description and the figures are merely examples of the present subject matter, and are not meant to represent the subject matter itself.

Figure 1:
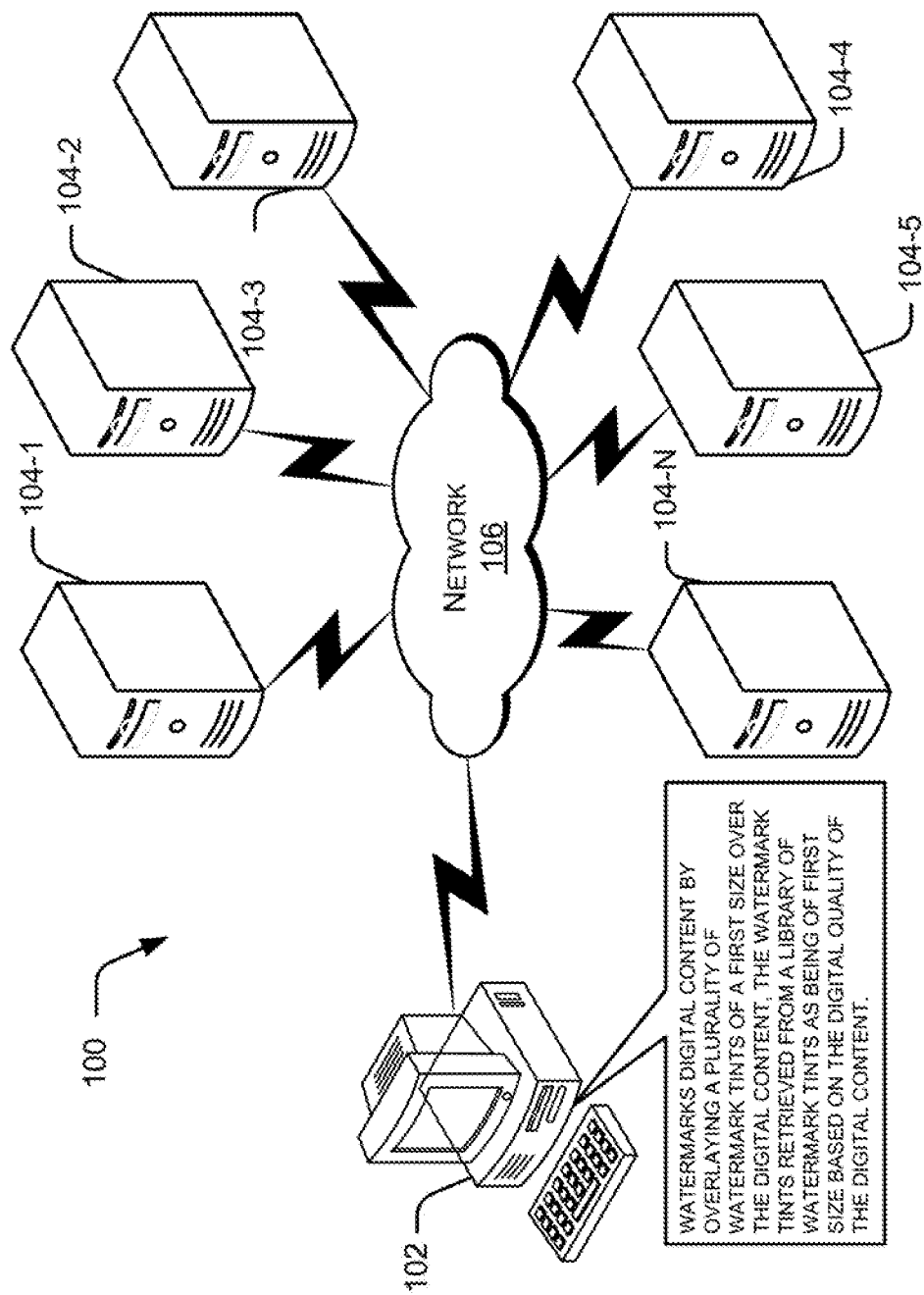
FIG. 1 illustrates a network environment having a watermarking system for watermarking digital content, according to an example.

Throughout the drawings, Identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Detectability of a watermark is relevant for fulfilling the purpose of the watermark itself. In few cases, a watermark embedded in digital content may be affected by changes to the digital content. In one example, in case a watermarked image is resized or rescaled, the watermark may become undetectable. For instance, in case the image is downscaled, it may result in the loss of details of the image, and hence, of the watermark, whereas, upscaling the image may lead to cropping of the watermark beyond detectability. In another example, if image processing techniques, such as distortion-type effects including blurring, twirling, or morphing, are applied to the image, such that the quality of the image is compromised, then the watermark may also be rendered undetectable.

In addition to the detectability and scalability, generally used watermarking techniques may involve complex procedures in which every time digital content is to be watermarked, images have to be extracted, watermarked by embedding a mark, scaled, and realigned. In few cases, the embedding the mark may involve calling and loading a third-party watermark library for use in watermarking. Such a complex procedure may, on one hand, cause a system performing the watermarking to have high latency and, on the other, may cause a size of the watermarked digital content to inflate by almost 5 to 10 times. Further, few watermarking techniques may involve sharing the digital content over a cloud-service which may raise a potential security and privacy concern, for instance, for sensitive or personal content.

Approaches for watermarking digital content are described. According to an aspect, the approaches involve creating a library of watermark tints in advance and applying one or more watermark tints to an input digital content by overlaying the watermark tints over the input digital content instead of embedding. As a result, the watermarking may be achieved with less expense of time and computational resources, since the watermark is independent of content quality and does not have to be formatted before being applied. The input digital content may be an image in digital form, an image to be printed on a print medium, or a video.

In an example, the library of watermark tints may be created using histogram compression technique, by which the watermark tint may be obtained. For instance, the watermark tint may be prepared in the form of a transparent image in portable network graphics (png) format. Each of such transparent images may be divided into tiles of a predefined size and a plurality of tiles of each predefined size may form a watermark tint set. In simpler words, the library of watermark tints may include a predetermined number of watermark tint sets, each set having watermark tints in the form of tiles of a predefined size. Additionally, as part of creating the library of watermark tints, each watermark tint so created is associated with a unique identification parameter, referred to as a payload ID, at the time of creation.

Further, a digital quality associated with the digital content is determined for ascertaining the size of watermark tints that are to be employed for watermarking the digital content. For example, in case of an image, the resolution of the image may be determined to ascertain the size of the watermark tints that are to be selected. For instance, a highest common divisor of the resolution may be determined to ascertain the size, referred to as a first size, of the watermark tints to be used.

In addition, as an example, once the size is determined, a number of watermark tints of the first size that would adequately cover the digital content is determined. Accordingly, a watermark tint set of the ascertained size and having the adequate number of watermark tints is obtained. Subsequently, for watermarking the digital content, the watermark tints of the first size are overlaid on the digital content for watermarking the digital content. In addition, as part of watermarking, user identification parameters, such as a user ID or a customer ID, may be embedded in each of the watermark tints and then overlaid on the digital content for watermarking the digital content.

Further, as mentioned previously, the payload ID is associated with each watermark tint as it is created. Accordingly, when a watermark tint is used or selected for being used, the payload ID is marked as used or reserved, as the case may be, i.e., in case the watermark tint has been overlaid and applied, the payload ID is marked as used. On the other hand, if the watermark tint has been selected for overlaying then the payload ID is marked as reserved. In the latter case, for example, if the watermark tint goes unused, the reserved payload ID is released for reuse.

Since the watermark tints are not modified or formatted to match a digital quality of the digital content to be watermarked and instead is simply overlaid over the digital content irrespective of the digital quality of the content, the watermark tints are agnostic to the size of the digital content and may achieve quick watermarking. Accordingly, the latency of a system performing the watermarking, according to the present subject matter, is considerably low. Accordingly, the present subject matter provides a technique of watermarking digital content by which multiple images may be watermarked simultaneously. For instance, at any given instance, at least 5 nodes may be run simultaneously based on the technique of the present subject matter for watermarking which is, inherently, a resource-intensive process, in general.

Additionally, the user identification parameters are embedded into the watermark tints instead of being embedded in the digital content which is to be watermarked. Since the digital quality of the watermarks remains considerably consistent, the information may be conveniently embedded without any pre-processing of the watermark tints. Accordingly, the watermarking as per the present subject matter is less resource and time intensive. In addition, since the tints are not resized or scaled to fit the digital content and are placed as repeating tiles, when the digital content is rescaled, the watermark tints may still be detected in the digital content. Further, the watermarking technique, as discussed above with respect to the present subject matter, may be used in printers for watermarking. For example, a print driver of a printer is able to watermark prints, the watermarking being based on the abovementioned technique.

The above aspects are further illustrated in the figures and described in the corresponding description below. It should be noted that the description and figures merely illustrate principles of the present subject matter. Therefore, various arrangements that encompass the principles of the present subject matter, although not explicitly described or shown herein, may be devised from the description and are included within its scope. Additionally, the word "coupled" is used throughout for clarity of the description and may include either a direct connection or an indirect connection.

FIG. 1 illustrates a network environment 100 having a watermarking system 102 for watermarking digital content, according to an example of the present subject matter. Examples of the watermarking system 102 may include, but are not limited to, servers, desktop computers, laptops, and the like. Accordingly, the watermarking system 102 may watermark the digital content in the manner that the watermark remains unaffected when the digital content is rescaled or modified using image processing techniques. In one example, the watermarking system 102 creates and applies the watermark which is not associated with any characteristics of the image, such as type, size, or digital quality of the image.

The watermarking system 102 may be part of the network environment 100 to cooperate and obtain requests and digital content for watermarking. In one example, as depicted in FIG. 1, the watermarking system 102 may be coupled to a plurality of customer devices 104-1, 104-2 . . . 104-N, collectively referred to as customer devices 104 and individually referred to as a customer device 104. Although the watermarking system 102 has been shown as being separate from the customer devices 104, in other examples, the watermarking system 102 may be deployed in one of the customer devices 104.

The watermarking system 102 may be coupled to the customer devices 104 over a network 106. The network 106 may be a wireless network, a wired network, or a combination thereof. The network 106 may also be an individual network or a collection of many such individual networks, interconnected with each other and functioning as a single large network, e.g., the Internet or an intranet. The network 106 may be one of the different types of networks, such as intranet, local area network (LAN), wide area network (WAN), and the Internet. The network 106 may either be a dedicated network, a virtual network, or a shared network, which represents an association of the different types of networks that use a variety of protocols, for example, Hypertext Transfer Protocol (HTTP), and Transmission Control Protocol/Internet Protocol (TCP/IP), to communicate with each other. An example of a network 106 may include Fiber Channel Protocol (FCP) on Fiber Channel media. In an example, the network 106 may include a Global System for Mobile Communication (GSM) network, a Universal Mobile Telecommunications System (UMTS) network, or any other communication network that use any of the commonly used protocols, for example, Hypertext Transfer Protocol (HTTP) and Transmission Control Protocol/Internet Protocol (TCP/IP).

In operation, the watermarking system 102 may, first, create a library of preformed watermark tints. In other words, the watermarking system 102 may generate watermark tints, according to aspects of the present subject matter, beforehand and store the same for watermarking digital content. According to an aspect, the watermarking system 102 may generate a transparent image which may be used for watermarking the digital content. In an example, the watermarking system 102 may divide the transparent image into multiple smaller tiles of various sizes, each referred to as a watermark tint, so that the smaller watermark tints may be used for effectively covering the entire the digital content without wastage. For example, the watermark tints may be collaged together over the digital content for watermarking the digital content. The watermarking system 102 may store, as part of the library of watermark tints, the watermark tints of the different sizes. The storage of the library of the watermark tints though depicted as being done by the watermarking system 102 in an internal storage, in another case, the watermarking system 102 may communicate with an external storage for storing the library of watermarks tints thereon.

As part of watermarking, the watermarking system 102 may receive digital content from the customer device 104 for watermarking. For example, the watermarking system 102 may operate in two modes for watermarking digital content. In one mode, referred to as online mode, the watermarking system 102 may obtain the digital content for watermarking in alive environment where a call is made by the customer device 104 for employing watermarking service. For instance, the customer device 104 may make a call through an application programming interface (API) and share the digital content to be watermarked with the watermarking system 102. In another mode, referred to as offline mode, the manner of watermarking is the same as explained above; however, in the offline mode, the user may not call or initiate the watermarking service. Instead, the user may upload a batch of digital content to be watermarked to the watermarking system 102 and the watermarking system 102 may achieve the watermarking of the batch of digital content in said offline mode.

Upon receiving the digital content, the watermarking system 102 may select, based on the digital quality of the digital content, a watermark tint set. The watermark tint set may have an ascertained number of preformed watermark tints of a predetermined size, alternatively referred to as a first size, determined on the basis of the digital quality of the digital content of the watermark. The watermark tints in the watermark tint set may then be overlaid over the digital content to watermark the digital content. The operation of the watermarking system 102 is described in detail with reference to FIG. 2A and FIG. 2B.

Figure 2A:
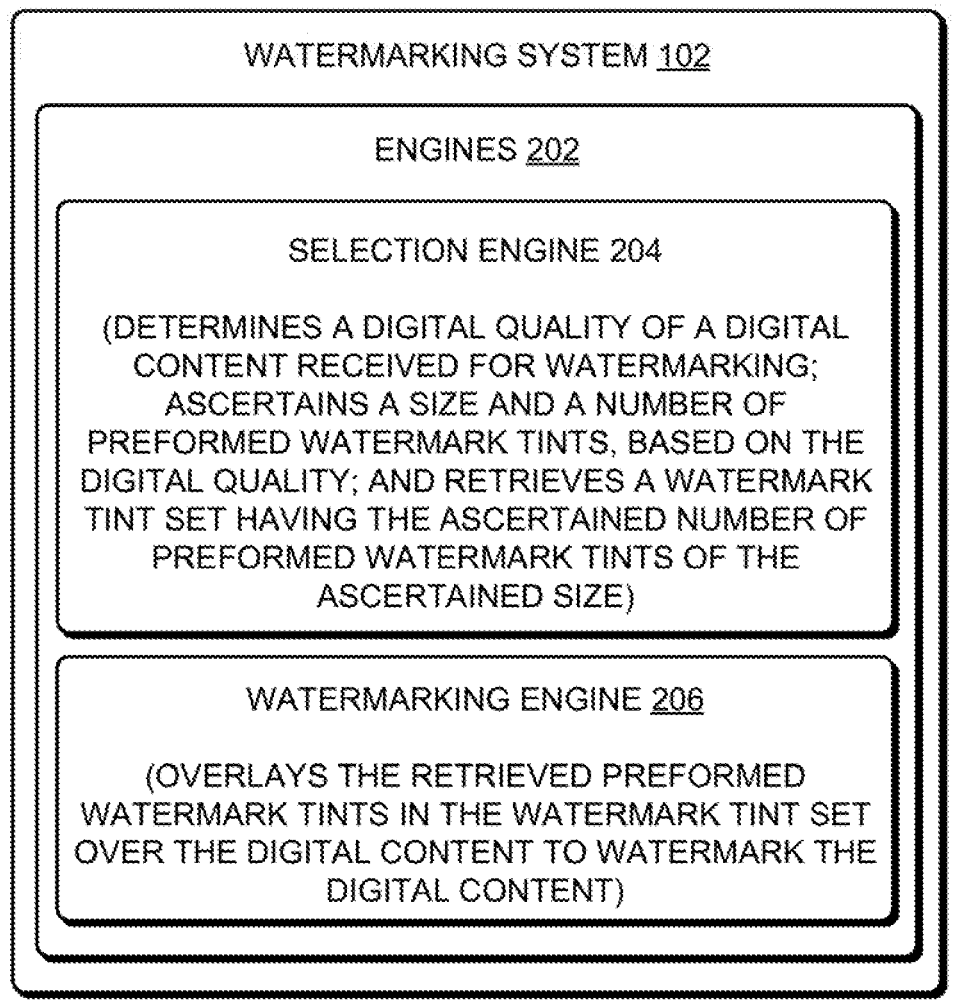
FIG. 2A illustrates a schematic of the watermarking system for watermarking digital content, according to an example.

FIG. 2A illustrates a schematic of the watermarking system 102 showing components of the watermarking system 102, according to an example of the present subject matter. The watermarking system 102 may include, for example, engines 202. The engines 202 are employed as a combination of hardware and programming (for example, programmable instructions) to use functionalities of the engines 202. In examples described herein, such combinations of hardware and programming may be used in a number of different ways. For example, the programming for the engines 202 may be processor executable instructions stored on a non-transitory machine-readable storage medium and the hardware for the engines 202 may include a processing resource (for example, processors), to execute such instructions. In the present examples, the machine-readable storage medium stores instructions that, when executed by the processing resource, deploy engines 202. In such examples, the watermarking system 102 may include the machine-readable storage medium storing the instructions and the processing resource to execute the instructions, or the machine-readable storage medium may be separate but accessible to watermarking system 102 and the processing resource. In other examples, engines 202 may be deployed using electronic circuitry. The engines 202 may include a selection engine 204 and a watermarking engine 206.

As mentioned previously, the watermarking system 102 may operate at two stages. In the first stage, the watermarking system 102 may create the library of preformed watermark tints, as explained above. In the second stage, the watermarking system 102 may watermark the digital content.

As part of watermarking the digital content, the watermarking system 102 may initiate the selection engine 204 to first determine a digital quality of the digital content received for watermarking. For instance, in case of an image, the digital quality may be the resolution of the image. In an example, the selection engine 204 may use the digital quality to determine a size and number of the preformed watermark tints for watermarking the digital content. Accordingly, the selection engine 204 may retrieve a watermark tint set from the library of preformed watermark tints, the watermark tint set having the ascertained number of preformed watermark tints of the ascertained size. In other words, the selection engine 204 may determine a size of the watermark tints and the number of watermark tints, in various combinations, which would be adequate for watermarking the digital content. Subsequently, the watermarking engine 206 may overlay the retrieved preformed watermark tints in the watermark tint set over the digital content to watermark the digital content.

Figure 2B:
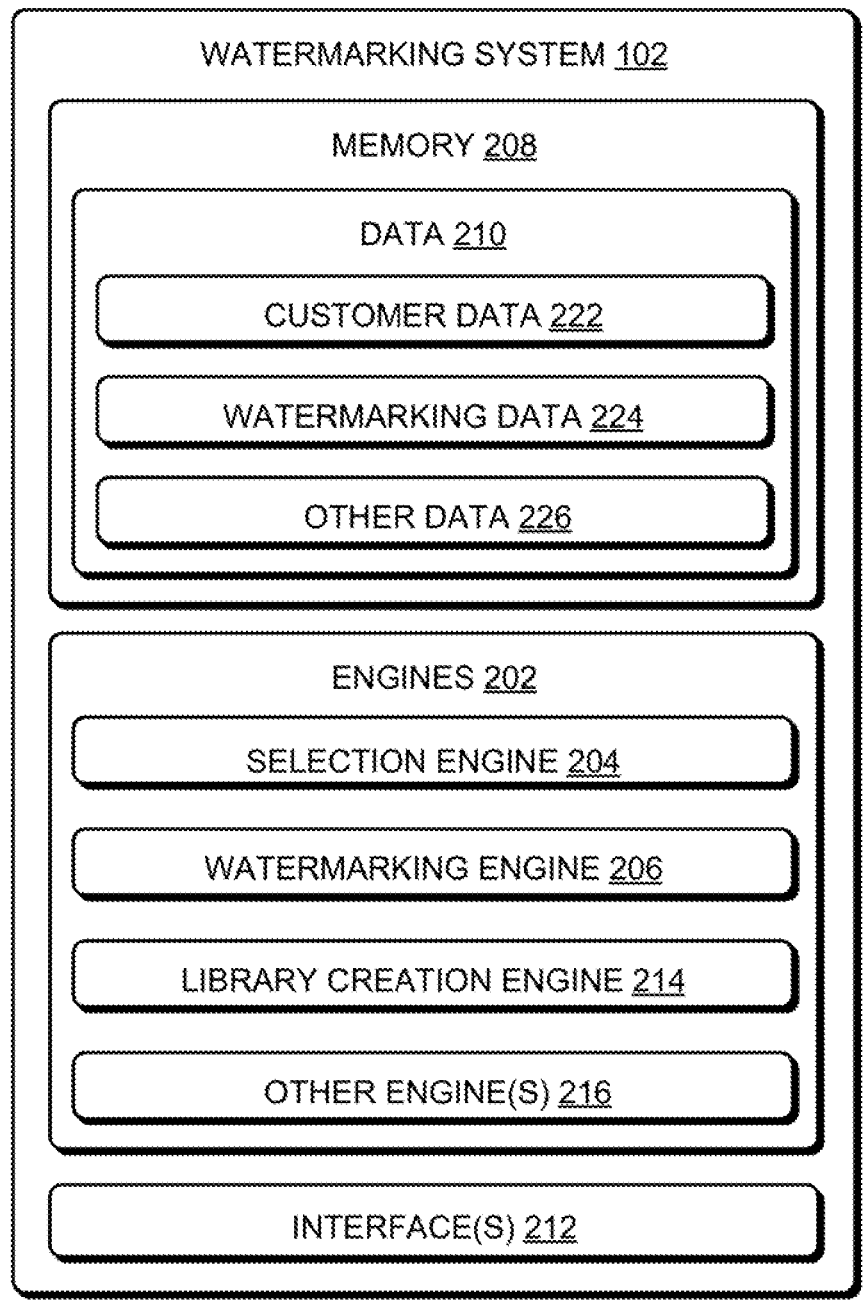
FIG. 2B illustrates a detailed schematic of the watermarking system showing various components thereof, according to an example.

The various components of the watermarking system 102 are described in detail in conjunction with FIG. 2B.

FIG. 2B illustrates a detailed schematic of the watermarking system 102 showing various components of the watermarking system 102, according to an example of the present subject matter. The watermarking system 102, among other things and in addition to the engines 202, a memory 208 having data 210, and interface(s) 212. The engines 202, among other capabilities, may fetch and execute computer-readable instructions stored in the memory 208. The memory 208, communicatively coupled to the engines 202, may include a non-transitory computer-readable medium including, for example, volatile memory, such as Static Random Access Memory (SRAM) and Dynamic Random Access Memory (DRAM), and/or non-volatile memory, such as Read-Only-Memory (ROM), erasable programmable ROM, flash memories, hard disks, optical disks, and magnetic tapes.

In an example, in addition to the selection engine 204 and the watermarking engine 206, the engines 202 may include a library creation engine 214 and other engine(s) 216. The other engine(s) 216 may provide functionalities that supplement applications or functions performed by the watermarking system 102.

Further, the data 210 includes data that is generated as a result of the functionalities carried out by any of the engines 202. The data 210 may include customer data 222, watermarking data 224, and other data 226. The other data 226 may include data generated and saved by the engines 202 to provide various functionalities to the watermarking system 102.

As mentioned previously, the watermarking system 102 may be coupled to the customer devices 104 over the network 106. In an example, the watermarking system 102 may be coupled to the network 106 through the interface(s) 212. The interfaces 212 may include a variety of commercially available interfaces, for example, interfaces for peripheral device(s), such as data input output devices, referred to as I/O devices, storage devices, network devices, and intermediate power devices. The interfaces 212 may facilitate multiple communications within a wide variety of networks and protocol types, including wired networks and wireless networks. As explained above, the watermarking system 102 may achieve the watermarking of digital content received from the customer device 104, and as part of watermarking, the selection engine 204, the watermarking engine 206, and the library creation engine 214 may cooperate to achieve the same.

To begin with, as mentioned previously, the watermarking system 102 may create the library of preformed watermark tints. For the purpose, the library creation engine 214 may beforehand create watermark tints of various sizes, each size in multiples, and store the watermark tints in the watermarking data 224. These preformed watermark tints may be later used by the watermarking engine 206 for watermarking the digital content, as and when a request for watermarking is received from the customer device 104.

In an example, the library creation engine 214 may employ histogram compression technique for generating the watermark tints and creating the library of preformed watermarks. In said example, the library creation engine 214 may use a white template image for creating watermark tints. For instance, the white template image may be an image all whose pixels are white. The library creation engine 214 may generate a grayscale image of the white template image. The library creation engine 214 may then apply histogram compression technique to the generated grayscale image and obtain a compressed image. Further, the library creation engine 214 may invert a colour of the compressed image and may use the alpha channel of the colour-inverted image to obtain a transparent image. For instance, based on an alpha value associated with a colour of the transparent image, the library creation engine 214 may regulate the transparency of the transparent image. The library creation engine 214 may then store the transparent image in the watermarking data 224 and may use that for creating the watermark tints. In an example, the library creation engine 214 may save the transparent image in portable network graphics (png) format.

Further, for creating the watermark tints, the library creation engine 214 may divide the transparent image into multiple smaller tiles of various sizes, each tile referred to as a watermark tint. For instance, an administrator may define standard sizes and numbers of the watermark tints that the library creation engine 214 may divide the transparent image into for creating the watermark tints. In another instance, the library creation engine 214 may divide the transparent image into a plurality of differently sized tiles, i.e., one tile having a different size from other tiles. While the library of watermark tints is described to have been stored in the watermarking data 224 shown internal to the watermarking system 102, the watermarking system 102 may communicate with an external storage for storing the library of watermarks tints thereon. In said example, explained above, the digital quality of the watermark tints is independent of the that of the digital content which is to be watermarked. In addition, as an example, the library creation engine 214 may associate a payload ID with each watermark tint being created and store the payload ID in the watermarking data 224. As will be explained later, the watermarking system 102 may employ the payload IDs to track the usage of watermark tints for watermarking or the reservation of the watermark tints for watermarking subsequently.

Once the library of preformed watermark tints has been created, watermarking system 102 is ready for use for watermarking digital content, such as audio, video, images, or the like. When digital content is received by the watermarking system 102, the selection engine 204 may come into action first. The selection engine 204 may first determine a digital quality of the digital content received for watermarking. For instance, in case the digital content is an image, the digital quality may be a resolution of the image or a pixel size associated with the image or a combination thereof. In another case, where the digital content is a video, the digital quality may refer to a frame rate of the video measured in frames per second (fps), a resolution of the frames of the video, or a pixel size associated with the frames of the video, or a combination thereof. In yet another example, the digital quality may refer to an aspect ratio of the digital content such as a video.

In an example, the selection engine 204 may use the digital quality of the digital content to plan the watermarking of the digital content, for example, to adequately cover the digital content while watermarking. In one case, the watermarking system 102 may cover the entire digital content while watermarking, whereas in another case, the watermarking system 102 may cover a portion of the digital content for watermarking the digital content. Accordingly, depending on the manner of operation of the watermarking system 102, the selection engine 204 may plan to the watermarking of the digital content.

As part of the planning, based on the digital quality of the digital content, the selection engine 204 may ascertain a size, interchangeably referred to as a first size, and a number of preformed tints that would be adequate for watermarking the digital content, the size and number being ascertained in light of the different sizes and numbers of the watermark tints available in the library. For instance, the selection engine 204 may obtain the information regarding the available sizes and the available numbers of the watermark tints in the library from the watermarking data 224. In one example, the selection engine 204 may fix the number of watermark tints, and may accordingly, determine the different sizes of the watermark tints that may be used for watermarking. In another example, the selection engine 204 may fix the size of watermarks to be used the size may be fixed and the selection engine 204 may determine the number of watermark tints of that size.

Subsequent to the determining the size and number, the selection engine 204 may retrieve the determined number of watermark tints of the ascertained size from the library of preformed watermark tints stored in the watermarking data 224. The selection engine 204 may retrieve the watermark tints as a watermark tint set having the determined number and size of the watermark tints. In another example, the selection engine 204 may retrieve a watermark tint set having the determined number of watermark tints of the first size. In said example, the library creation engine 214 may create the watermark tint set as a single batch of watermark tints which the selection engine 204 may retrieve, the watermark tint set including the determined number of tiles, i.e., watermark tints, of the determined first size.

Once retrieved, the watermarking engine 206 may overlay the watermark tints over the digital content to watermark the digital content. In other words, the watermarking engine 206 may superimpose the watermark tints collaged together to cover the digital content.

The watermarking achieved by the watermarking system 102, as explained above, is described further with respect to the following example. For example, in case the digital content is an image and the digital quality is determined in terms of the resolution (x, y) of the image, then the selection engine 204 may determine a highest common divisor of x and y and select the size and number of the watermark tints based on the highest common divisor. For instance, if the resolution of the image is 1920 pixels by 1080 pixels (1920×1080), then the selection engine 204 determines that the highest common divisor of 1920 and 1080 is 120. Accordingly, the selection engine 204 determines that 144 watermark tints of size 120 pixels in length and 120 pixels in width may be used for watermarking the image. In other words, the selection engine 204 ensures that the watermark tints of size 120 pixels by 120 pixels (120×120) will adequately cover the entire surface of the image when the watermarking engine 206 superimposes and tiles the watermark tints over the image.

In addition, as part of watermarking, the watermarking engine 206 may embed user identification parameters, such as a user ID or a customer ID, in the watermark. The watermarking engine 206 may obtain the user identification parameters from the customer data 222, based on the customer device 104 from which the request for watermarking is received. Accordingly, in one example, the watermarking engine 206 may embed the user identification parameters in each of the watermark tints. In another example, however, the administrator may define rules for embedding the user identification parameters, stored in the customer data 222. The watermarking engine 206 may then embed the user identification parameters in the watermark tints, based on the administrator-defined rules. For instance, based on the rules, the watermarking engine 206 may embed the user identification parameters in watermark tints at the corners or edges of the digital content.

Further, the watermarking system 102 may also be enabled to track the watermark tints in the library of preformed watermark tints, as described previously also. The watermarking engine 206 may track the watermark tints using the payload ID, which is unique to each watermark tint. Accordingly, when a watermark tint is used by the watermarking engine 206, i.e., overlaid or superimposed over the digital content, the watermarking engine 206 may mark that payload ID in the watermarking data 224 as "used". In few cases, such as in offline mode of watermarking, the watermarking system 102 may allow for a set of watermark tints to be reserved for use for watermarking. For instance, a customer device 104 may request the watermarking system 102 for reserving a few number of watermark tints of a few size(s) to be reserved for watermarking digital content that the customer device 104 may share at a later point in time. In such a case, the watermarking engine 206 may mark the payload IDs of the watermark tints set aside forlater use as "reserved" in the watermarking data 224. In said example, the watermarking system 102 may reserve the watermark tints for a predefined period. Upon the expiry of the period, the watermarking engine 206 may release the reserved watermark tints and unmark them in the watermarking data 224.

Figure 3:
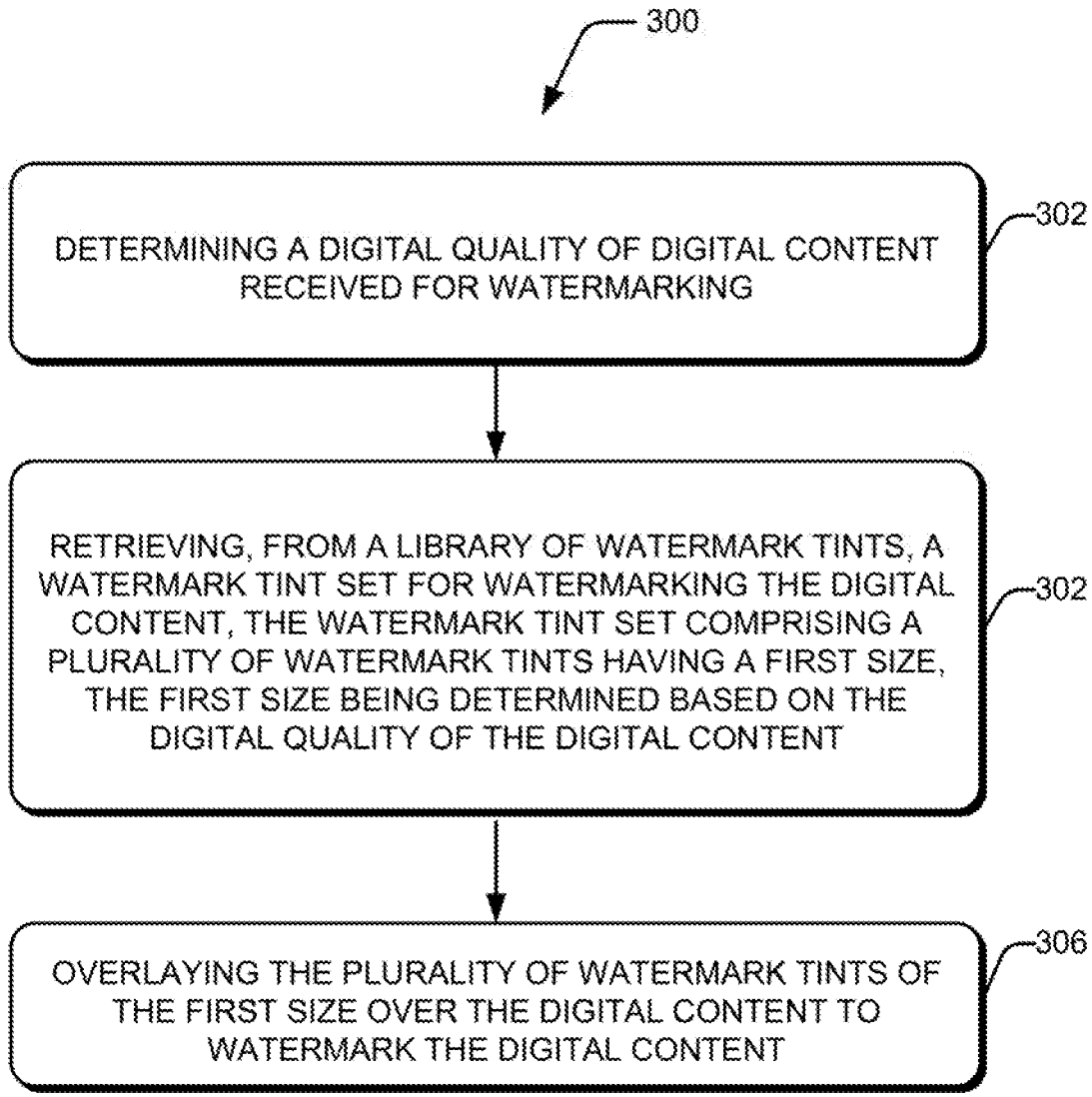
FIG. 3 illustrates a method for watermarking digital content, according to an example.
Figure 4:
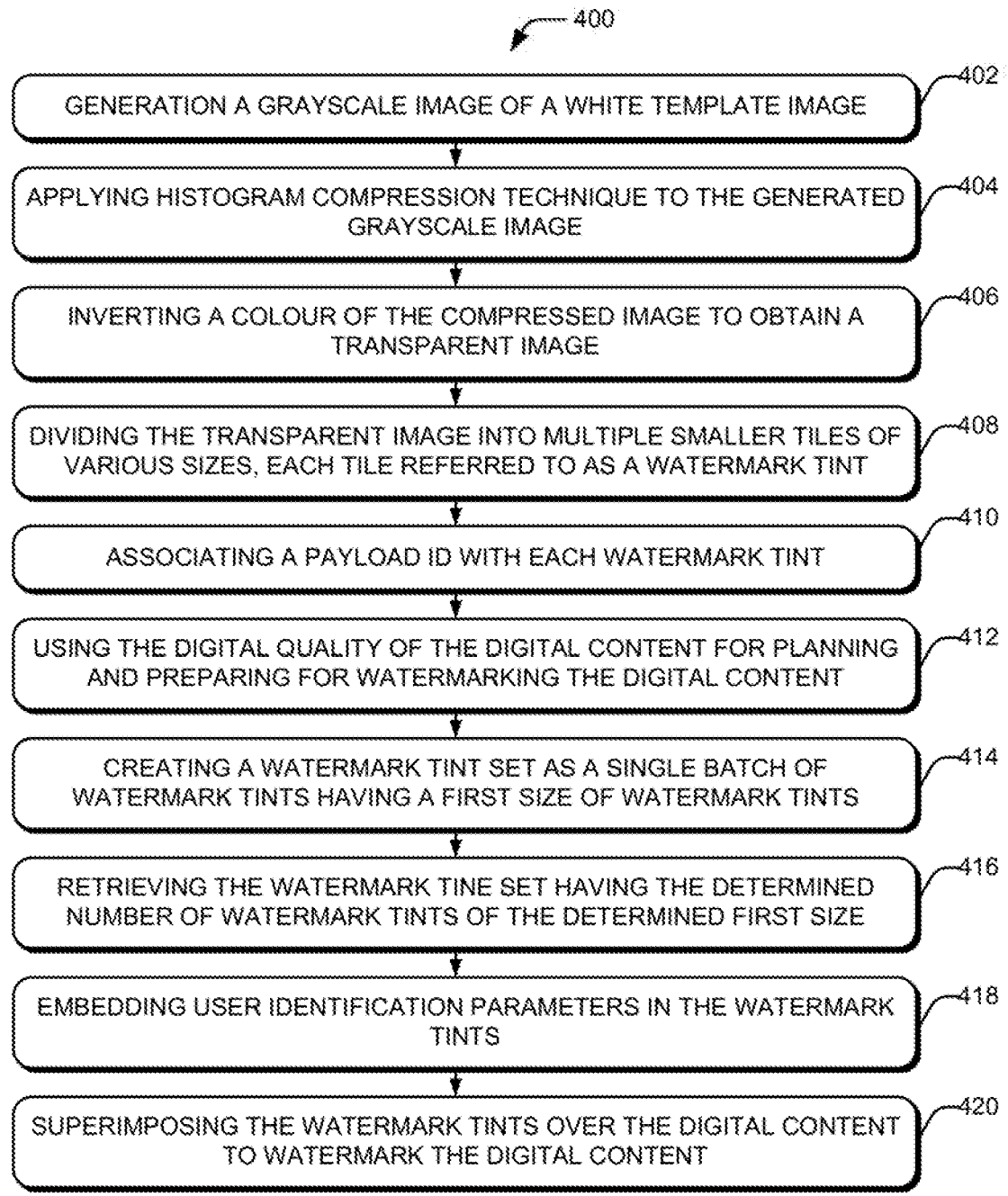
FIG. 4 illustrates a detailed method for watermarking digital content, according to an example.

Methods 300 and 400 are described in FIG. 3 and FIG. 4, respectively, for watermarking digital content, according to an example of the present subject matter. While FIG. 3 illustrates an overview of the method 300 for watermarking digital content, FIG. 4 illustrates a detailed method 400 for watermarking digital content.

The order in which the methods 300 and 400 are described is not intended to be construed as a limitation, and any number of the described method blocks may be combined in any appropriate order to execute the methods 300 and 400 or another method. Additionally, individual blocks may be deleted from the methods 300 and 400 without departing from the spirit and scope of the subject matter described herein.

The methods 300 and 400 may be performed by programmed computing devices, for example, based on instructions retrieved from non-transitory computer readable media. The computer readable media may include machine-executable or computer-executable instructions to perform all or portions of the described method. The computer readable media may be, for example, digital memories, magnetic storage media, such as a magnetic disks and magnetic tapes, hard drives, or optically readable data storage media.

The methods 300 may be performed by a computing system, such as the watermarking system 102. For the sake of brevity of description of FIG. 3 and FIG. 4, the components of the watermarking system 102 performing the various elements of the methods 200 and 300 are not described in detail with reference to FIG. 3 and FIG. 4. Such details are provided in the description provided with reference to FIG. 1, FIG. 2A, and FIG. 2B.

Referring to block 302, a digital quality of digital content received for watermarking may be determined. The digital content and a request for watermarking may be received from a customer device 104. For instance, in case the digital content is an image, the digital quality may be a resolution of the image or a pixel size associated with the image or a combination thereof. In another case, where the digital content is a video, the digital quality may refer to a frame rate of the video measured in frames per second (fps), a resolution of the frames of the video, or a pixel size associated with the frames of the video, or a combination thereof. In yet another example, the digital quality may refer to an aspect ratio of the digital content such as a video.

At block 304, the digital quality of the digital content may be used for planning and preparing for the watermarking of the digital content. Accordingly, at block 304, a watermark tint set is retrieved from the library of watermark tints, the library, as explained previously, comprising a plurality of preformed watermark tints of various sizes. As part of the retrieving, a size of the watermark tints that will be used for watermarking the digital content is determined, based on the digital quality of the digital content. Accordingly, the watermark tint set so retrieved from the library of watermark tints includes a plurality of watermark tints having a first size, same as that determined as mentioned above. In addition, as part of the retrieving a number of watermark tints of the first size may also be determined, based on the digital quality of the digital content.

At block 306, the watermark tints are overlaid or superimposed over the digital content to watermark the digital content. In an example, the watermark tints may be collaged together, as tiles, to cover the digital content and watermark the digital content.

FIG. 4 illustrates a detailed method 400 for watermarking digital content, according to an example of the present subject matter. In an example, block 402 to block 410 and block 414 to block 416 of the method 400 may be understood be part of block 304 of method 300. In an example, block 402 to block 410 may be part of creation of the library of watermark tints.

At block 402, a grayscale image of a white template image is generated. For instance, the white template image may be an image all whose pixels are white.

Thereafter, at block 404, histogram compression technique may be applied to the generated grayscale image to obtain a compressed image.

Further, at block 406, a colour of the compressed image may be inverted to obtain a transparent image. In an example, an alpha channel of the colour-inverted image may be used to obtain the transparent image. For instance, based on an alpha value associated with a colour of the colour-inverted image, the transparency of the transparent image may be controlled.

Accordingly, at block 408, the transparent image may be divided into multiple smaller tiles of various sizes, each tile referred to as a watermark tint. For instance, an administrator may define standard sizes and numbers of the watermark tints that the transparent image is divided into for creating the watermark tints. In another instance, the transparent image may be divided into a plurality of first sized tiles, i.e. tiles having a predetermined size.

At block 410, a payload ID, which is a unique identification parameter, may be associated with each watermark tint created at block 408.

At block 412, the digital quality of the digital content is used for planning and preparing for watermarking the digital content. In case the resolution of the digital content is in terms of (x, y), then at block 412, a highest common divisor of x and y may be determined to select the size of the watermark tints that will be used for watermarking the digital content. For instance, along with the determined size, same as the first size, of the watermark tints that will be used, the number of the watermark tints that will be used for watermarking the digital content is also determined based on the highest common divisor.

At block 414, the watermark tint set having the first size of watermark tints is created as a single batch of watermark tints. The watermark tint set may also be created having the determined number of watermark tints of the determined first size.

At block 416, the watermark tine set having the determined number of watermark tints of the determined first size is retrieved to watermark the digital content.

At block 418, user identification parameters, such as a user ID or a customer ID, may be embedded in the watermark tints. In an example, the user identification parameters may be embedded in each of the watermark tints. In another example, the user identification parameters may be embedded selectively in the watermark tints, for instance, in the watermark tints to be used at the corners or edges of the digital content.

At block 420, as at block 306, the watermark tints are overlaid or superimposed over the digital content to watermark the digital content. In an example, the watermark tints may be collaged together, as tiles, to cover the digital content and watermark the digital content.

Figure 5:
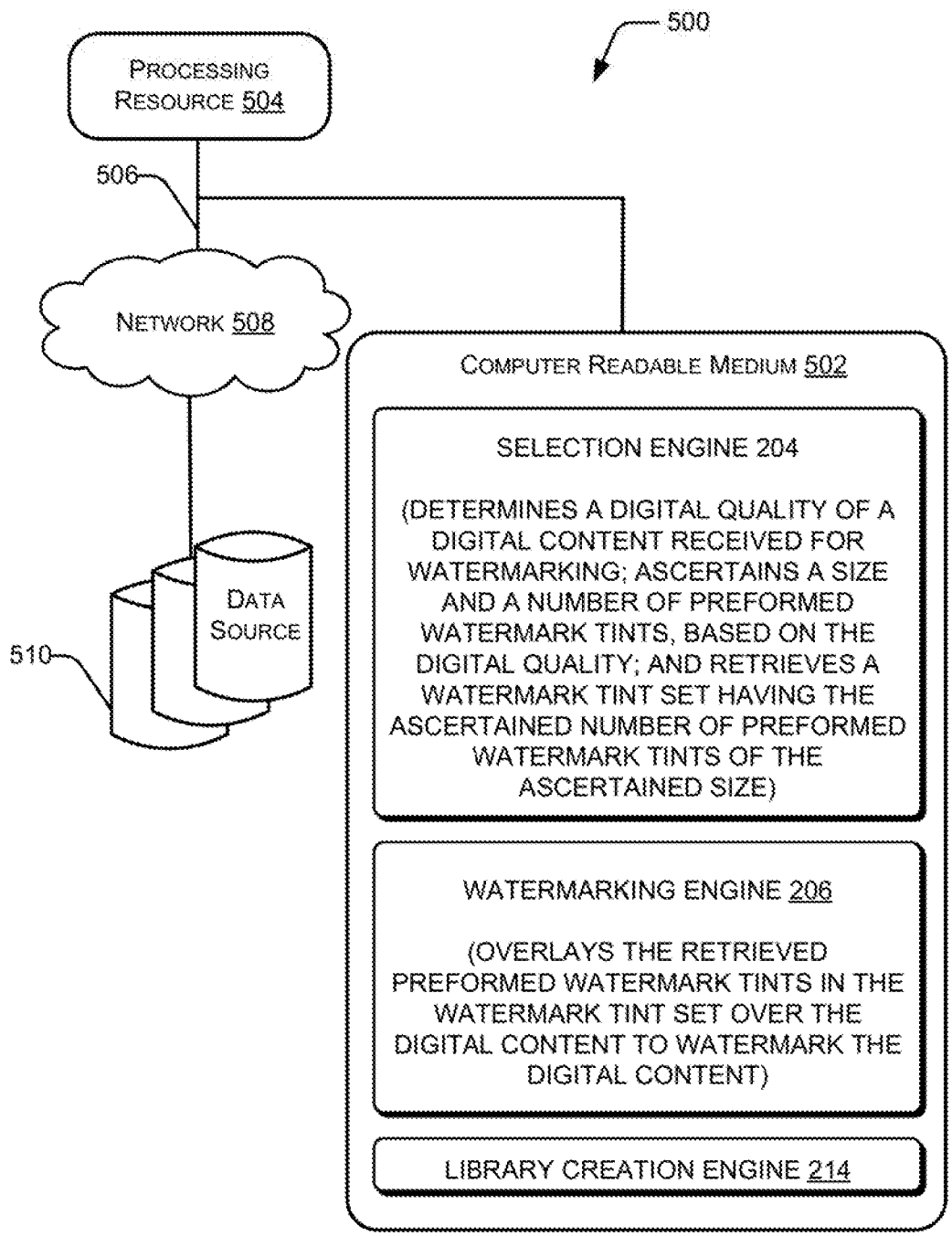
FIG. 5 illustrates a network environment using a non-transitory computer readable medium to watermark digital content, according to an example.

FIG. 5 illustrates an example network environment 500 using a non-transitory computer readable medium 502 to watermark digital content, according to an example of the present subject matter. The network environment 500 may be a public networking environment or a private networking environment. In one example, the network environment 500 includes a processing resource 504 communicatively coupled to the non-transitory computer readable medium 502 through a communication link 506.

For example, the processing resource 504 may be a processor of a computing system, such as the watermarking system 102. The non-transitory computer readable medium 502 may be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 may access the non-transitory computer readable medium 502 through a network 508. The network 508 may be a single network or a combination of multiple networks and may use a variety of communication protocols.

The processing resource 504 and the non-transitory computer readable medium 502 may also be communicatively coupled to data sources 510 over the network 508. The data sources 510 may include, for example, databases and computing devices. The data sources 510 may be used by the database administrators and other users to communicate with the processing resource 504.

In one example, the non-transitory computer readable medium 502 includes a set of computer readable and executable instructions, such as the library creation engine 214, the selection engine 204, and the watermarking engine 206. The set of computer readable instructions, referred to as instructions hereinafter, may be accessed by the processing resource 504 through the communication link 506 and subsequently executed to perform acts for network service insertion.

For discussion purposes, the execution of the instructions by the processing resource 504 has been described with reference to various components introduced earlier with reference to description of FIG. 2A and FIG. 2B.

On execution by the processing resource 504, the selection engine 204 may determining a digital quality associated with the digital content received for watermarking. In case the digital content is an image, a resolution (x, y) of the image is determined. In case the digital content is in other format than the image, an aspect ratio (x:y) associated with the digital content may be determined. In said example, the integers x and y may have few values when indicating the resolution and may have entirely different values, partially same, or the same values when indicating the aspect ratio. The selection engine 204 may then ascertain a size and a number of preformed watermark tints to watermark the digital content based on the resolution or the aspect ratio, as the case may be. Accordingly, the selection engine 204 may determine a highest common divisor of x and y of the resolution and then based on the highest common divisor, the selection engine 204 may determine the size and number of the watermark tints that will be used for watermarking the digital content. In other words, the selection engine 204 may further select, based on the highest common divisor, a watermark tint set comprising the ascertained number of preformed watermark tints of the ascertained size. As explained previously with reference to the preceding figures, the library creation engine 214 forms each preformed watermark tint by generating a transparent digital content in the same format as the digital content that may be watermarked by the watermarking engine 206. In an example, the library creation engine 214 may generate the transparent digital content using histogram compression technique. Then, the library creation engine 214 may divide the transparent digital content into a plurality of tiles of different sizes. Subsequently, the watermarking engine 206 may overlay the preformed watermark tints in the watermark tint set over the digital content to watermark the digital content.

In addition, on execution by the processing resource 504, the watermarking engine 206 may track the usage and reservation of the watermark tints. For example, the library creation engine 214 may associate a payload ID with each preformed watermark tint when creating the watermark tints. To track the watermark tints, the watermarking engine 206 may mark a payload ID associated the preformed watermark tint as used when the preformed watermark tint is overlaid. In another case, where the watermark tint is reserved for later use, the watermarking engine 206 may mark a payload ID associated with that preformed watermark tint as reserved, i.e., when the preformed watermark tint is selected and reserved for overlaying.

In an example, the description with reference to FIG. 5 explains the process of watermarking after the preparation phase of creating the library of the watermark tints has been completed, in the manner as explained previously. However, for the purposes of the completion, the process of creating the library of watermark tints and its detailed aspects described above are a part of the operation of the library creation engine 214 described in FIG. 5.

Although examples for watermarking digital content have been described in language specific to structural features and/or methods, it is to be understood that the appended claims are not limited to the specific features or methods described. Rather, the specific features and methods are disclosed as examples for watermarking digital content.

I claim:

1. A method comprising:
    determining a digital quality of digital content received for watermarking;
    retrieving, from a library of watermark tints comprising a plurality of preformed watermark tints of predefined sizes, a watermark tint set for watermarking the digital content, the watermark tint set comprising a plurality of watermark tints having a first size, wherein the first size of the plurality of watermark tints is determined based on the digital quality of the digital content; and
    overlaying the plurality of watermark tints of the first size over the digital content to watermark the digital content.

2. The method as claimed in claim 1, wherein the retrieving comprises creating the library of watermark tints, the creating comprising:

generating a grayscale image of a white template image;
applying histogram compression to the generated grayscale image to obtain a compressed image; and
inverting a colour of the compressed image to obtain a transparent image.

3. The method as claimed in claim 2, further comprising:
dividing the transparent image into a plurality of ties of the first size to obtain a watermark tint; and
creating the watermark tint set having a predetermined number of watermark tints of the first size therein.

4. The method as claimed in claim 3, wherein the creating comprises associating a payload ID with the watermark tint.

5. The method as claimed in claim 1, wherein the retrieving comprises:
determining a highest common divisor of a resolution associated with the digital content; and
selecting the first size based on the determining.

6. The method as claimed in claim 1, wherein the overlaying comprises marking a payload ID associated with each of the plurality of preformed watermark tints as used.

7. The method as claimed in claim 1, wherein the overlaying comprises marking a payload ID associated with each of the plurality of preformed watermark tints as reserved when the plurality of tints is selected for overlaying.

8. The method as claimed in claim 1, wherein the overlaying comprises embedding user identification parameters in each of the plurality of watermark tints.

9. A watermarking system (102) comprising:
a selection engine (204) to,
determine a digital quality of a digital content received for watermarking;
ascertain a size and a number of preformed watermark tints for watermarking the digital content, based on the digital quality of the digital content;
retrieve a watermark tint set from a library of watermark tints, the watermark tint set comprising the ascertained number of preformed watermark tints of the ascertained size; and
a watermarking engine (206) to overlay the retrieved preformed watermark tints in the watermark tint set over the digital content to watermark the digital content.

10. The watermarking system (102) as claimed in claim 9, further comprising a library creation engine (214) to:
generate a grayscale image of a white template image;
compress the generated grayscale image using histogram compression technique;
invert a colour of the compressed image to obtain a transparent image; and
divide the transparent image into a plurality of tiles, each tile forming a preformed watermark tint.

11. The watermarking system (102) as claimed in claim 10, wherein the library creation engine (214) is to create a watermark tint set of a first size having a predetermined number of tiles of the first size.

12. The watermarking system (102) as claimed in claim 10, wherein the library creation engine (214) is to associate a payload ID with each watermark tint.

13. The watermarking system (102) as claimed in claim 9, wherein the selection engine (204) is to:
determine a highest common divisor of a resolution associated with the digital content; and
ascertain the size and the number of the watermark tints based on the highest common divisor of the resolution.

14. A non-transitory computer-readable medium (502) comprising instructions executable by a processing resource (504) of a device to:
determining one of an aspect ratio (x:y) and a resolution (x, y) of digital content received for watermarking;
ascertain a size and a number of preformed watermark tints to watermark the digital content based on a highest common divisor of x and y, each preformed watermark tint formed by generating a transparent format of a white template image using histogram compression technique and dividing the transparent image into a plurality of tiles of different sizes;
select, based on the highest common divisor, a watermark tint set comprising the ascertained number of preformed watermark tints of the ascertained size; and
overlay the preformed watermark tints in the watermark tint set over the digital content to watermark the digital content.

15. The non-transitory computer-readable medium (502) as claimed in claim 14, further comprising instructions executable by the processing resource (504) to:
associate a payload ID with each preformed watermark tint;
mark the payload ID associated the preformed watermark tint as used when the preformed watermark tint is overlaid; and
mark the payload ID associated with the preformed watermark tint as reserved when preformed watermark tint is selected for overlaying.

* * * * *